Sept. 3, 1963　　　F. J. LUKETA　　　3,102,357
LINES FOR TRAWL NETS
Filed Oct. 20, 1961　　　5 Sheets-Sheet 1

INVENTOR.
FRANK J. LUKETA
BY Reynolds & Christensen
ATTORNEYS

Sept. 3, 1963 F. J. LUKETA 3,102,357
LINES FOR TRAWL NETS
Filed Oct. 20, 1961 5 Sheets-Sheet 2
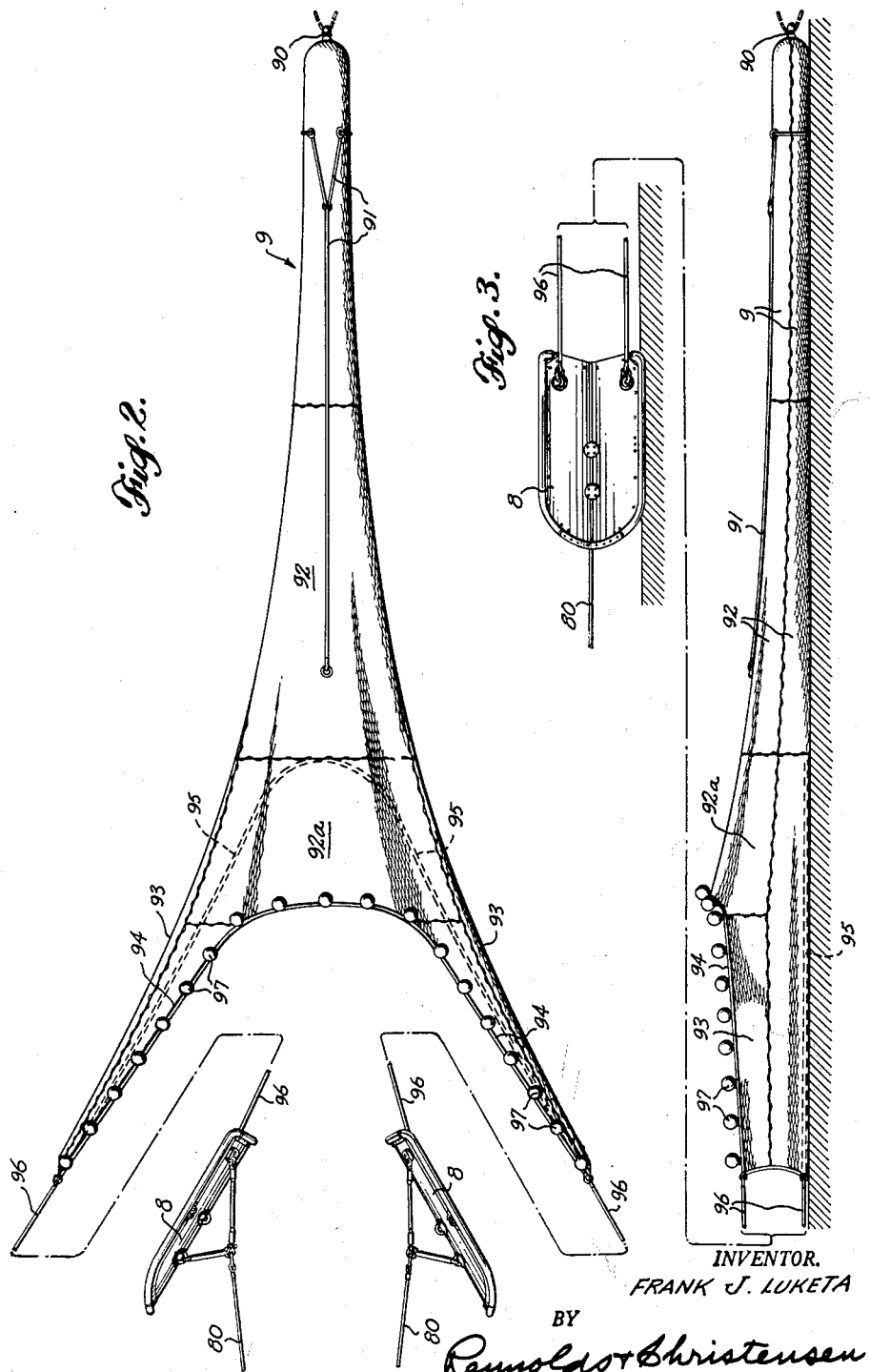
INVENTOR.
FRANK J. LUKETA
BY
Reynolds + Christensen
ATTORNEYS

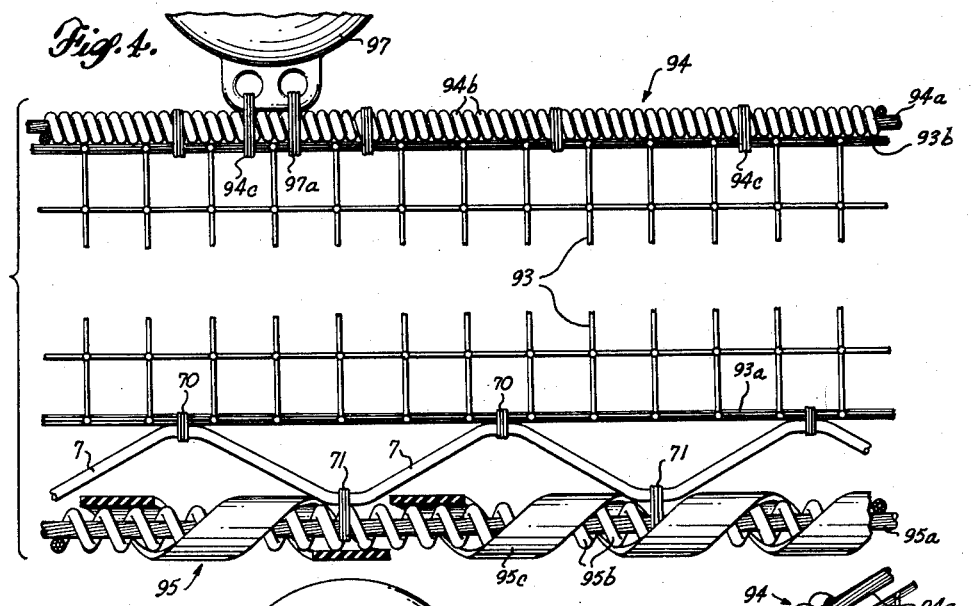
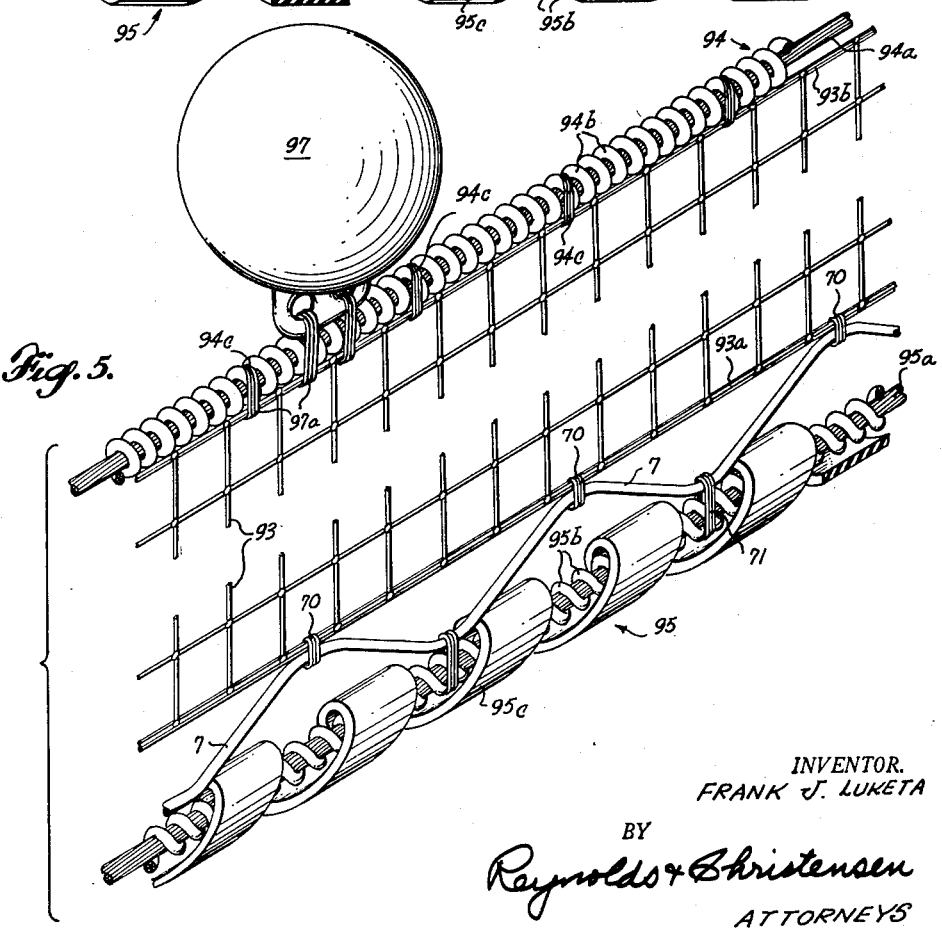

Sept. 3, 1963  F. J. LUKETA  3,102,357
LINES FOR TRAWL NETS
Filed Oct. 20, 1961  5 Sheets-Sheet 4
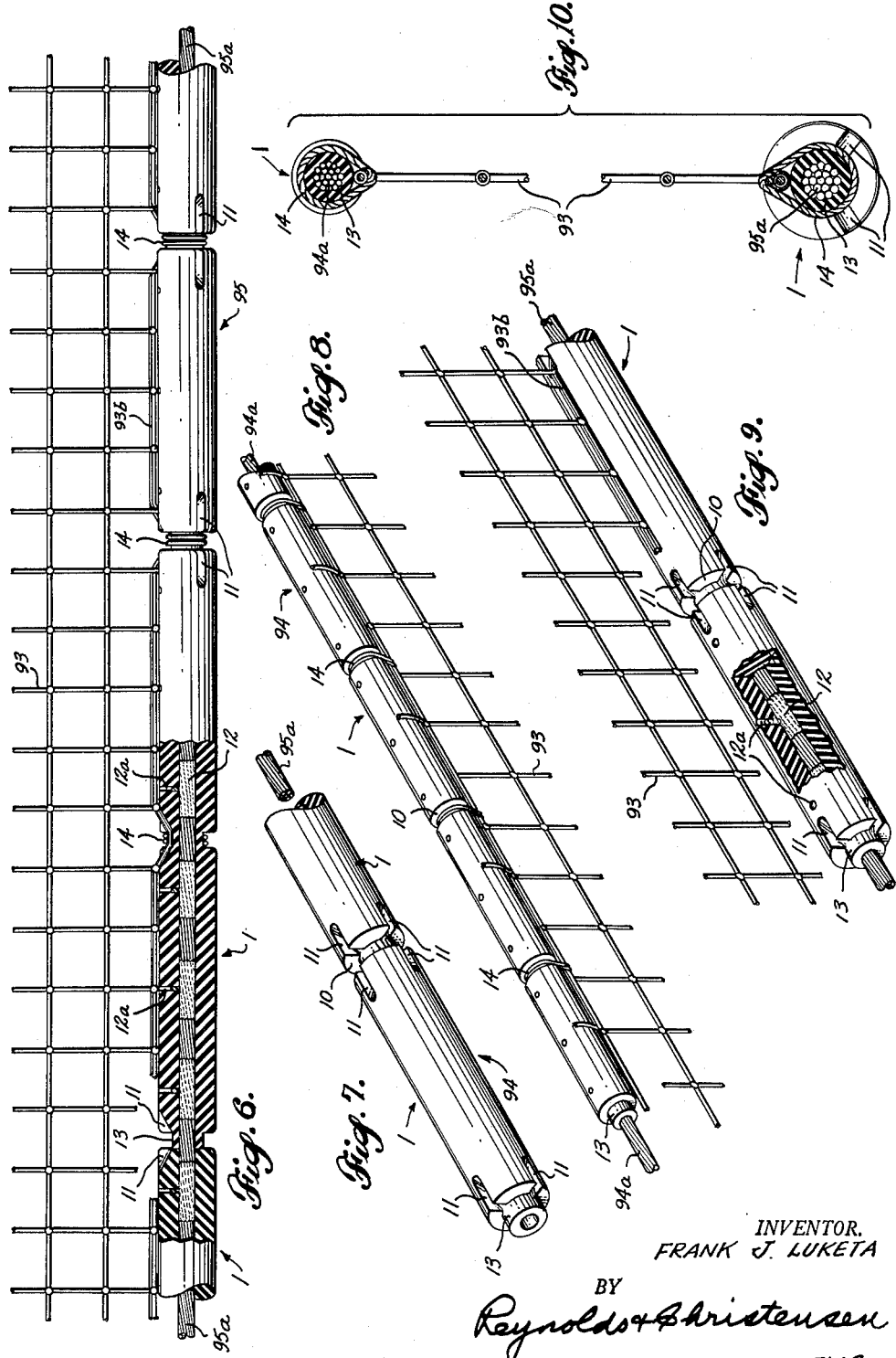
INVENTOR.
FRANK J. LUKETA
BY
Reynolds & Christensen
ATTORNEYS Sept. 3, 1963   F. J. LUKETA   3,102,357
LINES FOR TRAWL NETS
Filed Oct. 20, 1961   5 Sheets-Sheet 5
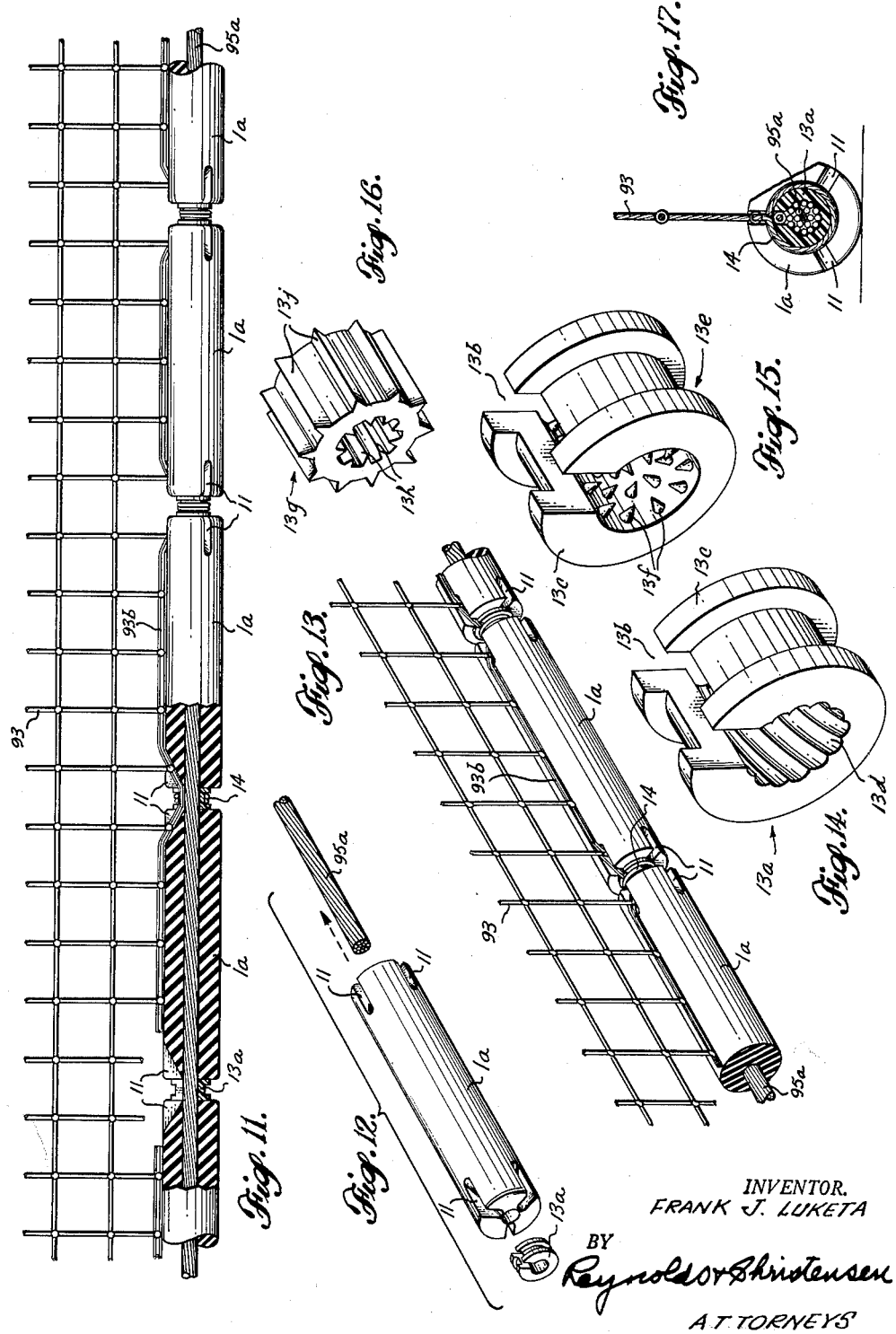
INVENTOR.
FRANK J. LUKETA
BY Reynolds & Christensen
ATTORNEYS

United States Patent Office 3,102,357
Patented Sept. 3, 1963

3,102,357
LINES FOR TRAWL NETS
Frank J. Luketa, 5567 Greenwood Ave., Seattle, Wash.
Filed Oct. 20, 1961, Ser. No. 154,383
16 Claims. (Cl. 43—9)

In my Patent No. 3,018,581 entitled "Trawl Lines," and issued January 30, 1962, the application for which was copending herewith, there are disclosed various forms of lines for use in trawling operations, particularly bottom trawling, and a primary object therein was to orient the various accessories (floats, weights, etc.), which are distributed along the edges of net panels, correctly relative to the water by reason of the assumed correct orientation of each such net panel to a line and of such line to the accessory which is secured to it. This present invention is concerned primarily with the attainment and maintenance of correct alignment (as that term is hereinafter defined) of the many ties or seizings in the length of the line which connect the line to the edge of the netting, notwithstanding torsional forces which may act upon the line and tend to enwrap the line with the netting. Otherwise expressed, this invention concerns the attainment and maintenance of correct orientation of the individual lines throughout their length relative to the net panels, and vice versa, and with certain forms of line-encasing and wear-resisting elements and the manner of their securement upon the line, and to the net panel, but not to the orientation of line-carried accessories relative to the net panels, unless incidentally.

To explain further, various forces will tend, in use, to create torsion in the line which defines and protects an edge of a net panel. The ground line in particular, which defines the lower edge of the net, is subject to several torsion-producing forces. One of these is the effect of the rope with which the steel cable core of the line is helically wrapped, under current practice. Such rope tends to contract when wet and to relax when dry. Put into the water dry, it shortens and tends to rotate the line. Another such force may be the effect of tension that tends to straighten the lays in the stranded wire cable. If the line were to be secured at close intervals in its length directly to the edge of the mesh panel, any such torsion-producing forces would tend to roll the cable within the netting and the latter would chafe upon the bottom, and would soon wear away, and require repair or replacement. Even if the line is not a bottom line, such torsional forces tend to distort the net, and may enwrap the netting partially about the line.

It is customary, therefore, to secure the ground line, and sometimes other such lines, to the edge of the mesh panels through the intermediary of a loose, looped hanging line or galling line. This in effect constitutes the edge portion of the mesh, and if it becomes wrapped about the line, its wear life is, at least, better than would be the netting's, and it is cheaper to replace. The rope wrapping about the cable is itself protected against chafing by an overwrap of a protective chafing strip of rubber or the like, but the edge portion of the net has always been subject to wear, from the torsion-producing forces such as those mentioned. Because of the complex organization at such an edge, and the numerous elements which must be assembled in correct sequence and relationship, whenever replacement or repair of any part— rope wrapping, chafing strip, or hanging line—is required, there must be virtually complete disassembly and tedious reassembly, all of which takes time, care, and much labor.

Even if torsional forces were not present there still would be no precise and simple way in previous practice to attach the netting to the ground or float lines without some misalignment.

Accordingly, it is an object of this invention to provide a simple arrangement whereby the edge of a net panel can be secured to a ground line or float line in a simple manner, eliminating most of the tedious operations heretofore required, and eliminating most of the parts and forces that might produce torsion, while at the same time assuring correct and continuing orientation of the line relative to the net panel. In particular is it an object to provide simple mechanical constructions for use in such lines, and which will protect the cable and the seizings, which secure the netting to the lines, from chafing, and by elimination of torsion that would wrap the netting about the line, will indirectly protect the net from wear due to chafing.

It is also an object to minimize the frontal area, hence the drag, of such lines.

While the present invention deals broadly with such objects, and so is not primarily concerned so much with orientation of accessories which may be secured to the line, as with the orientation of line and netting relative to one another, it will also effect orientation of the accessories, if any are so secured, hence in this respect this invention is generic to the invention disclosed and claimed in my application identified above. Further specific forms will be disclosed and claimed in companion applications, later identified.

The invention is also concerned with mechanical structures to the above ends, and is shown in several alternative forms, and the preferred form among those shown herein will be specified later.

FIGURE 2 is a top plan view, and FIGURE 3 a side elevational view, of the same typical net.

FIGURE 4 is an elevational view of the manner of conecting float lines and ground lines to trawl nets, as heretofore practiced, and FIGURE 5 is an isometric view of the same.

FIGURE 6 is an elevational view, partly broken away and sectioned, of one manner of connecting a ground line to a trawl net and of orienting the two, according to this invention.

FIGURE 7 is an isometric view of an orienting molded element of the form of the invention shown in FIGURE 6, employed to encase the cable core.

FIGURE 8 is an isometric view of the manner of connecting and orienting a float line to a trawl net (or more specifically to the edges of the appropriate net panels) according to this invention.

FIGURE 9 is an isometric view, partly broken away and sectioned, of the manner in which the lower edge of a net panel is connected to and oriented with respect to a ground line, according to this invention.

FIGURE 10 is a transverse sectional view through the net and its float line and ground line, connected according to this invention.

FIGURE 11 is a view similar to FIGURE 6, but illustrating a different specific form of the ground line assembly.

FIGURE 12 is a view similar to FIGURE 7, of the form shown in FIGURE 11. This, in general, represents the preferred form of the several forms shown herein.

FIGURE 13 is an isometric view similar to FIGURE 9, showing the form used in FIGURES 11 and 12.

Figure 1:
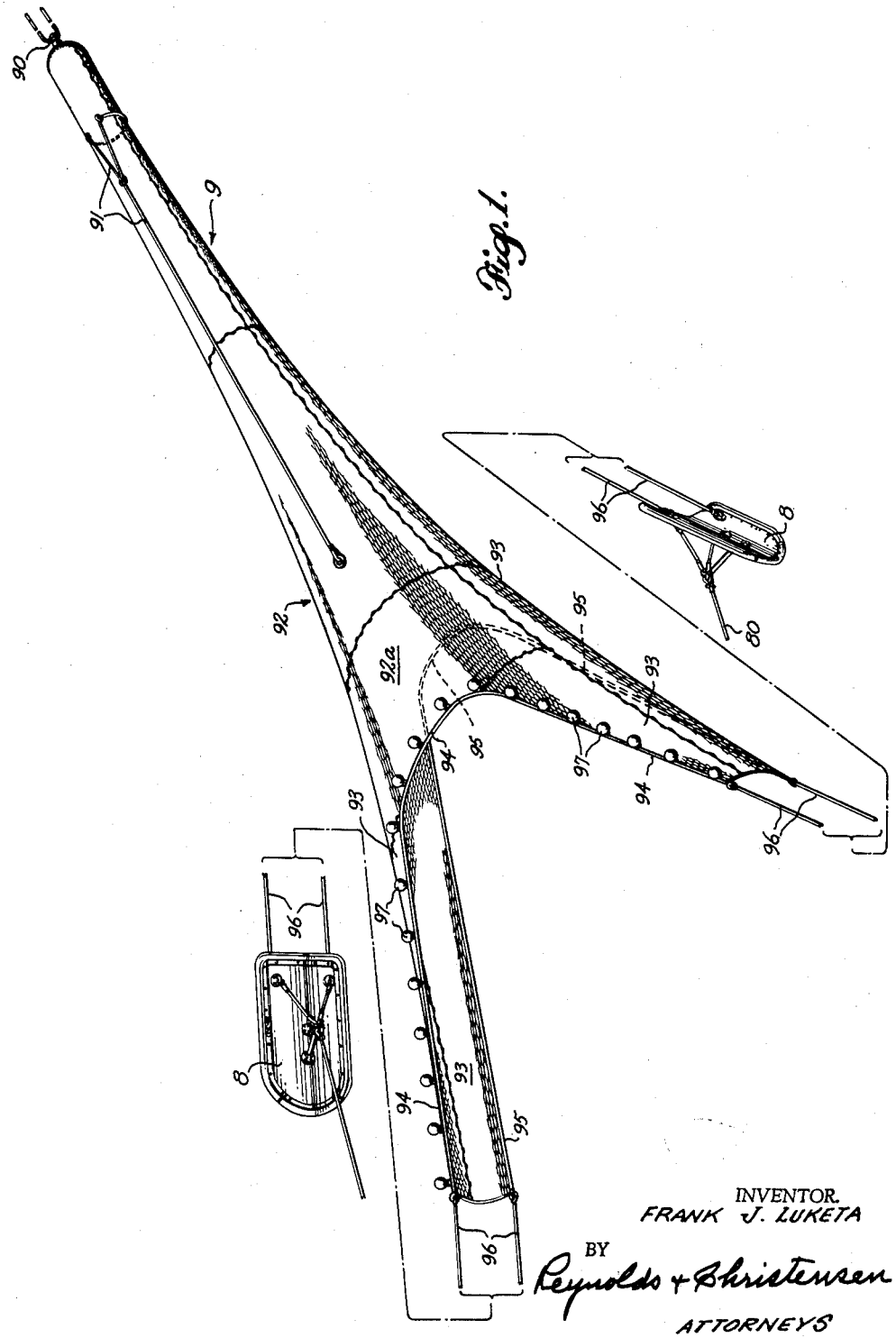
FIGURE 1 is an isometric view of a typical conventional bottom trawl net in which the present invention can be incorporated.

FIGURES 14, 15, and 16 illustrate variant forms of separate spacers, such as may be used with the form of orienting means shown in FIGURE 12.

FIGURE 17 is a cross-sectional view showing a partly chafed line, but with the netting rehung to another groove in the protective casing to thus use, economically, an unworn part.

It will be helpful to an understanding of the present invention to make clear how lines have been connected heretofore to the edges of net panels and how the known connections create problems. To that end FIGURES 1 to 3 disclose a specific and known type of bottom trawl net, not per se my invention, in which this invention may be incorporated, and FIGURES 4 and 5 illustrate the specific and heretofore customary manner of connecting lines to the edges of net panels. The net shown, known as a "standard" trawl net, includes an elongated codend 9, pursed at 90 at its after end during use, but open forwardly. A conventional "split" line 91 encircles an after portion of the codend, and extends forwardly. At its forward end the codend is connected to the funnel 92 and the overhang 92a is an extension of the funnel, and from the funnel, wings 93 extend divergently forward during trawling. A float line 94 and a ground line 95 are secured along the top and bottom edges of the netting of the funnel and the wings. Each such line, depending on the net size, may be fifty to one hundred fifty feet long. The present invention will be described primarily in association with these two lines, of which the ground line is usually somewhat longer than the float line. They extend transversely of the funnel, constituting upper and lower bosoms, respectively. Sweep lines 96 extend forwardly of the wings to doors 8 that are towed by towing warps 80. These doors, of desired size and shape, and at a selected angle of attack to the water through which they are towed, cause the wings to veer outwardly away from each other. The float line 94 is buoyed up by floats 97 distributed along it. The entire net is dragged over the bottom, and is subject to chafing. Chafing gear (not shown) protects the net proper, but wherever a line or net panel mesh drags over the bottom there must be protection against tearing and chafing.

The net panel shown in FIGURES 4 and 5 may be taken as that of a wing 93, and these figures illustrate how the float line 94 and ground line 95 are secured to the panel edges, and the lines per se, and the seizings 71 are protected against chafing, yet the net itself may be chafed because of the presence of torsional forces mentioned earlier, which cause a tendency for the net to wrap about these lines.

The ground line 95 has not been connected heretofore directly to the lower edge of the net panel, but rather is connected through a hanging line or galling line 7 of cord. This is tied at intervals to a doubled (or trebled) bar 93a at the net panel's lower edge, as indicated at 70. Excess length is left in the hanging line, which loops downwardly between successive points of connection to the net's edge, and each such loop is tied to the ground line 95, at 71. The ground line is primarily a stranded steel wire cable 95a. The ties 71, if they merely encircled the cable 95a, would be insufficiently restrained against slippage lengthwise, and this would result in a badly distorted net and cause unevenness of tension in the panel 93. Accordingly, the cable 95a is first seized with wrappings 95b of rope, rather closely spaced and tightly wrapped, yet affording recesses to receive the ties 71, and to prevent displacement of the latter lengthwise of the ground line 95. Since this ground line drags over the bottom, the chafing would quickly wear out the ties 71 and seizings 95b so a chafing strip 95c of rubber-like, wear-resistant material enwraps the line 95 and protects it and the ties and seizings. The entire length of each chafing strip must be threaded through successive loops of hanging line 7, so their application is a slow, tedious operation, and since the ground line is subject to much wear as it is dragged along the bottom much labor and time is expended in maintaining this part of the trawl net.

The float line 94 is usually connected more directly to the upper edge of the net panel, yet here there must be provision to guard against slippage of ties or seizings lengthwise of the stranded wire cable 94a, wherefore the rope wrapping 94b is employed, analogous to the rope wrapping 95b. The double-bar upper edge 93b of the net panel is tied at intervals, at 94c, to the float line, and the wrapping 94b prevents displacement of the ties 94c in the longitudinal direction. Floats 97 can be similarly tied, at 97a, at definite locations. The float line is not ordinarily exposed to much chafing, hence does not require a chafing strip analogous to 95c. Nevertheless, it is a slow, tedious job when repair requires replacement of the wrapping 94b.

The wrappings 94b and 95b are of rope, hence will contract when wet and extend when dry. This, because of their helical emplacement about the wire cables, produces a torsional effect which may wrap the net panel partly about the lines 94 or 95. This is undesirable at either edge of the net panel, for a number of reasons, and at the lower edge is particularly objectionable, as it exposes the enwrapped mesh or hanging line to chafing such as will quickly require replacement of the same, with the drawbacks mentioned above. Torsion in the lines from any cause will tend to produce similar results. The present invention precludes such torsional effects, from whatever cause, hence prolongs net life and usefulness.

FIGURES 6 to 10 disclose an arrangement to such ends. Here the cables 94a and 95a are completely encased throughout their length by a casing of a wear-resistant material such as rubber. At intervals in the length of such casing, corresponding normally to multiples of the length of the mesh squares, provision is made for reception of a longitudinal bar or similar edge of the net panel in alignment, as that term is defined hereinafter, to prevent initial interconnection along a helical line, and provision is also made for tying the net's edge to the casing, at similar intervals, in such manner that the ties or seizings are submerged within the outer surface of a casing element to protect it, and so chafing of the ties is avoided. The casing may be continuously of one piece from end to end of the cable which it encircles, or may be made in components of shorter lengths, even to lengths which correspond to the spacing between individual ties. Various forms are shown which are suitable. In the aggregate they should encase the cable from end to end.

A form that employs casing sections of a length to extend past several ties is shown in FIGURES 6 to 10. Each section 1 includes several circumferential grooves 10, at spacings corresponding, for example, to the width of three (in FIGURE 8), or five (in FIGURES 6 and 9), mesh squares of the netting 93. Adjacent each groove 10 are longitudinal slots 11, which need extend only a short distance along the section 1. The casing section is preferably of a wear-resistant rubber-like material. It might be molded in place upon its cable 94a or 95a, but preferably is threaded along such cable from one or both ends. Care is taken to align the longitudinal grooves 11, and to assure maintenance of their alignment the casing section may be adhered to the cable, as by an adhesive 12 injected through access holes 12a. A section terminates at one end in a reduced neck 13 which when butted against the complemental and usually plane end of the adjoining section defines a circumferential groove 10 (see FIGURE 6).

The horizontal edge bar of the netting 93 is laid in the successive aligned longitudinal slots 11, and is tied and held therein by enwrapping ties 14 received within the circumferential grooves defined by the neck 13. The edge bar, intermediate the grooves 10, merely lies along the surface of the casing section 1, away from where there can be any chafing. The ties 14 may be part of a continuous seizing twine, and if so this also extends along the surface of the casing section, away from any chafing area.

There may be several series of longitudinal slots 11 angularly distributed about the casing sections, as seen in FIGURES 7, 9, 10, 12 and 17. When chafing wears away one area to an extent to endanger the integrity of the ties 14, as is the case in FIGURE 17, the casing can be rotated about the line, or if adhered thereto the entire line can be rotated about its axis and the netting refastened in another groove 11, to present a fresh area to chafing, as is shown in FIGURE 17.

While the form of FIGURES 6 to 10, wherein the casing sections are sufficiently long to include several ties 14, is quite acceptable, a somewhat better and more flexible form is that in FIGURES 11 to 16, wherein each section is of the proper length between successive ties, and separate reduced necks or spacers are interspersed at the tie points. Thus, in FIGURES 11 to 16, the section 1a is formed with the longitudinal slots 11, at least at one end, but the circumferential grooves are defined by the spacers 13a, for example, which are or have circumferential portions of less outside diameter than the sections 1a. The spacer, of rubber or molded nylon, for example, may be uninterruptedly annular, to be threaded onto the cable, or split at 13b to straddle the cable 94a or 95a, for installation, and to define a bar-receiving slot aligned with the longitudinal slots 11 of the sleeves. Desirably it has end flanges 13c, and its bore is molded to correspond to the lay of strands in the cable, as at 13d. If molded of soft rubber-like material, or of nylon, each spacer when constricted by its tie 14 grips the cable and its bar tightly, and slippage is prevented. The casing section 1a therefore need not be adhered to the cable.

The spacer 13e is similar to the spacer 13a, except that it is formed with points 13f projecting inwardly from its bore, to enter interstices between individual strands of the cable, and so to prevent slippage.

Either such form of spacer receives and is constricted by the tie 14, and so grips and secures the lower or the upper bar of the net panel in correct alignment because of the slots 11.

The spacer 13g of FIGURE 16 is slightly different. It is shown as uninterruptedly circular, but like the others it could be split for ease of installation. It is made preferably of rubber which is resiliently deformable. The ribs 13h within its bore engage the individual strands of the cable to prevent relative rotation, and the ties 14 indent the exterior ribs 13j, for secure engagement.

One possible objection to the forms described so far is that the dipping of the net's lower bar into the slots 11 and into the reduced-diameter spacers, necks, or the equivalent, will shorten this lower bar by a small amount, relative to all parallel bars, and the cumulative effect of numerous such ties will pull slack in the edge bar lengthwise of the net panel and relative to all parallel bars. Forms which overcome this difficulty are disclosed in a companion allowed application, designated Case C Serial No. 149,007 filed October 31, 1961.

The manner of installing the casing upon the cable should be obvious. The entry of the edge bar of the netting mesh (which need be doubled) at frequent intervals into the longitudinal grooves 11, which are all initially aligned, insures that the edge of the netting will be substantially or even precisely straight. The cable has no external force tending to produce torsion to rotate it, and the tendency of tension to straighten its lays is rather slight and even this could eliminated by using non-rotating cable. The netting hangs in a straight line from the float line 94, and the ground line 95 hangs with no twist below the netting's lower edge. If a tear or break requires replacement or repair at some point in the netting, the ties 14 in this area are easily released, whereupon the netting is completely free of the line or lines, and after repair can be reengaged with the lines, with assurance of correct alignment, merely by renewing or replacing the ties. The casing elements will almost never be injured, but if they should be, split sections could be substituted, similar to the split spacers 13a, 13e for damaged sections.

Even though the net's edge is intended to be maintained straight by the aligning means 11 which receive or engage it, there may still be intended gradual angular displacement of these aligning means lengthwise of the cable in certain parts of its length. For example, along the ground line 95 the netting is intended to depart generally upwardly from the line, in the portion thereof that cooperates with the wing, but the bottom of the funnel 92 extends horizontally from the ground line. In consequence, there has been an angular displacement of the net's edge by 90°, more or less, in the transitional portion between the wing and funnel. Rather than permit some wrapping of netting about the line, the aligning means can be arranged for gradual angular displacement at such portions of the line's length, and such intended displacements are still to be understood as in "correct alignment," and are included within the term "aligned," or like terms, as used either in this specification or in the claims.

The elimination of torsion in the lines and wrapping of the netting about the line avoids chafing of the netting itself upon the bottom, and causes the net always to hang in relaxed fashion, as intended. This lessens wear and drag. The construction is relatively inexpensive, and the labor and time saved in maintenance is considerable.

I claim as my invention:

1. A protective casing for a cable which extends lengthwise of an edge of a netting panel, and for securing such edge to the cable in correct alignment lengthwise of the cable, said casing including a plurality of components constituting spacer elements and sleeve elements respectively, in alternation lengthwise of the cable, the components being each of a size to encircle the cable, and encircling the same in use, the spacer elements being located at intervals which correspond to multiples of the mesh squares of the netting, and the sleeve elements being of a length to occupy the space between successive spacer elements, at least one such element having means defining a slot directed lengthwise of the cable at the location of each spacer element, for the reception of the net's edge, the several slots being correctly aligned, in use, with the slots of all other such elements, and a removable tie encircling at least a portion of each spacer element and the net's edge received between the slot-defining means, thereby to leave the net's edge, where it extends intermediate the successive ties, in correct alignment lengthwise of the casing.

2. A protective casing for a cable as defined in claim 1, wherein each sleeve element is formed, at one end at least, with the slot-defining means.

3. A protective casing for a cable as defined in claim 1, wherein the several spacer elements are externally of less diameter than the sleeve elements, and the ties encircle such reduced spacer elements.

4. A protective casing for a cable as defined in claim 1, wherein each spacer element and all intervening sleeve elements are separately formed, and in use are disposed end to end, to complete the protective casing.

5. A protective casing for a cable as defined in claim 1, wherein a plurality of spacer elements and sleeve elements are integrally joined in a casing component, and in use are disposed end to end relative to further such casing components.

6. A protective casing for a cable as defined in claim 1, including means to anchor casing components against rotation relative to the cable.

7. A protective casing as defined in claim 1, wherein the several spacer elements are circumferentially grooved below the level of the adjoining sleeve elements, the ties being received in such circumferential grooves and being protected against chafing by the larger diameter sleeve.

8. A protective casing for a cable as in claim 7, including means interengageable between the casing components and the cable to prevent rotation of the casing components relative to the cable.

9. A protective casing for a stranded cable as in claim 8, wherein the rotation-preventing means include spline ridges extending lengthwise of the spacer elements and complementarily engageable with the cable's strands.

10. A protective casing for a cable as defined in claim 1, wherein each spacer element is longitudinally slotted for the reception of the edge of the netting, and the encircling ties squeeze the spacer elements to grip the so-received ties, said spacer elements being of slightly deformable material.

11. A protective casing for a cable as defined in claim 1, wherein each spacer element is, in all parts, including its tie-engaging portion, of less external diameter than the adjoining sleeve elements, and each adjoining sleeve element is externally longitudinally slotted inwardly from its ends for reception of the edge of the netting panel when the same is pulled thereinto by the ties encircling the netting edge and the spacer element.

12. A protective casing for a cable as in claim 11, wherein each sleeve element is longitudinally slotted at angularly spaced intervals around said sleeve for reception of the netting edge in any of said slots.

13. In combination with a netting panel and a cable extending lengthwise of an edge thereof, casing means for said cable including a plurality of spacer elements located at intervals which correspond to multiples of the mesh squares of the netting, and of a size to encircle the cable, sleeve elements of a size to encircle the cable and of a length to occupy the space between successive spacer elements, said sleeve means, in the vicinity of each spacer element, including means nonrotatively engaged with the edge of the netting to maintain alignment, in that portion of the netting, with other such means on said sleeve adjacent others of said spacer elements, and ties engaging each spacer element and encircling the net's edge along the line of alignment, to leave the net's edge extending intermediate the spacer elements in correct alignment lengthwise of but externally of the sleeve elements.

14. In combination with a panel of netting, which in use extends at a given orientation, as vertically or horizontally, from an edge, a line for connection to such edge, including a wear-resistant casing component formed with longitudinally directed slots at intervals, disposed at an angle about the line's axis that corresponds to such orientation, and formed also with circumferential grooves intermediate the ends of the longitudinal slots, and ties received within the circumferential grooves and tightened about the edge bar of the netting panel to retain such edge bar within the longitudinal grooves, to maintain the given orientation.

15. In combination with a fishing net panel formed of mesh squares each of a given length, a nonextensible line to which an edge of said panel is directly secured, and a casing surrounding said line and formed with circumferential grooves at intervals which are a whole multiple of the given length, said casing also being grooved lengthwise of the panel edge, and ties engaging the panel edge at intervals corresponding to the intervals between said circumferential grooves, each tie being received in one of the circumferential grooves, the edge of the panel being thereby received within the longitudinal groove.

16. The combination of claim 15, and ribs of elastic material upstanding within and disposed transversely of the circumferential grooves, and engaging the ties when deformed by the latter.

References Cited in the file of this patent

UNITED STATES PATENTS 2,894,366    Leckie  ---------------- July 14, 1959

FOREIGN PATENTS 382,354    Great Britain ---------- Oct. 27, 1932